United States Patent [19]

Smith

[11] 4,297,465

[45] Oct. 27, 1981

[54] CATALYSTS FOR POLYMERIZING PROPYLENE IN A HIGH TEMPERATURE SOLUTION PROCESS

[75] Inventor: Thomas W. Smith, Longview, Tex.

[73] Assignee: Eastman Kodak Company, Rochester, N.Y.

[21] Appl. No.: 201,955

[22] Filed: Oct. 29, 1980

[51] Int. Cl.$^3$ .......................... C08F 2/06; C08F 10/06
[52] U.S. Cl. ................................ 526/141; 252/429 B; 526/152; 526/351
[58] Field of Search ........................................ 526/141

[56] References Cited

U.S. PATENT DOCUMENTS

| | | | |
|---|---|---|---|
| 2,965,627 | 12/1960 | Field et al. | 526/141 |
| 3,219,648 | 11/1965 | Hill | 526/141 |
| 4,187,196 | 2/1980 | Giannini et al. | 526/125 |

FOREIGN PATENT DOCUMENTS

| | | | |
|---|---|---|---|
| 1128090 | 9/1968 | United Kingdom | 526/141 |
| 1128724 | 10/1968 | United Kingdom | 526/141 |

*Primary Examiner*—Edward J. Smith
*Attorney, Agent, or Firm*—Clyde L. Tootle; Daniel B. Reece, III

[57] ABSTRACT

This invention relates to improved catalysts for the polymerization of propylene and higher α-olefin in a high temperature solution process comprising (1) a beta amino carboxylic ester, (2) an aluminum trialkyl and (3) a transition metal halide. More particularly, this invention relates to catalysts for the catalytic high temperature solution polymerization of α-mono-olefins containing at least 3 carbon atoms to form solid, highly crystalline polymers. More specifically, the catalysts of the present invention produce polypropylene in a high temperature solution process at very high polymer to catalysts yields.

15 Claims, No Drawings

CATALYSTS FOR POLYMERIZING PROPYLENE IN A HIGH TEMPERATURE SOLUTION PROCESS

This invention relates to improved catalysts for the polymerization of propylene and higher α-olefins in a high temperature solution process comprising (1) a beta-amino carboxylic ester, (2) an aluminum trialkyl and (3) a transition metal halide. More particularly, this invention relates to catalysts for the catalytic high temperature solution polymerization of α-mono-olefins containing at least 3 carbon atoms to form solid, highly crystalline polymers. More specifically, the catalysts of the present invention in a high temperature solution process produce polypropylene at very high polymer to catalysts yields.

It is well known that in the catalytic polymerization of α-olefins it is possible to produce polymers having widely different properties and physical characteristics depending, to a large extent, upon the catalyst system and the process conditions. Much of the work in this field has been directed to the development of catalysts and catalytic processes that are capable of forming highly crystalline poly-α-olefins, i.e., those having crystallinities of at least 70%, since it has been shown that these highly crystalline polymers have greater commercial importance than the amorphous poly-α-olefins.

A number of methods have been proposed for preparing such solid, highly crystalline poly-α-olefins including, for example, the polymerization of higher α-olefins such as propylene and butene-1 to highly crystalline polymers in slurry processes in the presence of inert diluents at temperatures of 100° C. or below and at relatively low pressures. Catalyst mixtures that have been employed in these so called slurry processes comprise an aluminum compound, e.g., an aluminum alkyl, a dialkyl aluminum halide, an alkyl aluminum sesquihalide or lithium aluminum tetraalkyl, a transition element halide and third components including amines, e.g., U.S. Pat. No. 3,189,590. However, when catalysts of this type are used at temperatures above 100° C., the process provides low crystalline polymers having low molecular weight and low inherent viscosity. Therefore, these prior art catalysts, which are very effective for the stereospecific polymerization of propylene in lower temperature slurry and gas phase processes are normally undesirable for use in commercial high temperature solution processes.

In accordance with this invention, it has been found that propylene and higher α-olefins, i.e., those containing more than 3 carbon atoms, either alone or in admixture, can be polymerized at elevated temperatures to solid, high molecular weight polymer having a crystallinity of at least 72 percent, inherent viscosity of at least 1.3. Moreover, catalyst activities of at least 400 grams of polymer per gram of transitional metal halide per hour are obtained using a catalyst mixture comprising, for example, (1) a beta-amino carboxylic ester, (2) an aluminum trialkyl and (3) a transition metal halide such as the halide of titanium, vanadium, chromium, molybdenum or tungsten in which the valence of the metal is at least one less than maximum. This catalyst is extremely effective for polymerizing α-olefins containing at least 3 carbon atoms, and particularly the straight and branched chain aliphatic α-monoolefins containing 3 to 10 carbon atoms, to solid, high molecular weight, highly crystalline polymers in excellent yield by commercially feasible methods. The higher α-olefins suitable for use in the practice of this invention include, therefore, propylene, butene-1, pentene-1, hexene-1, heptene-1, octene-1, decene-1, dodecene-1, 3-methyl-1-butene, 4-methyl-1-butene, 4-methyl-1-pentene, 4-methyl-1-hexene, 5-methyl-1-hexene, 4,4-dimethyl-1-pentene and similar α-olefins containing at least 3 carbon atoms.

As already indicated, one component of the catalyst mixture is beta-amino carboxylic ester having the formula

$$R-CO_2CH_2CH_2NR_2'$$

wherein R is hydrogen, alkyl, alkenyl or aryl; R' is hydrogen or an alkyl. Suitable R and R' alkyl groups include straight chain or branched alkyl radicals containing about 1 to 12 carbon atoms, and preferably containing 1 to 8 carbon atoms. Such alkyl radicals include methyl, ethyl, propyl, isopropyl, butyl, isobutyl, octyl, decyl, dodecyl and the like. For R' in particular methyl and ethyl radicals are preferred. Alkenyl groups suitable for use in R include straight chain and branched unsaturated hydrocarbons containing 2 to 12 carbon atoms, including vinyl, isopropenyl, hexenyl, octenyl, and the like. Aryl groups suitable for use in R include phenyl and naphthyl. Specific compounds include, for example, 2-dimethylaminoethyl formate, 2-dimethylaminoethyl acetate, 2-dimethylaminoethyl propionate, 2-dimethylaminoethyl isobutyrate, 2-dimethylaminoethyl butyrate, 2-dimethylaminoethyl acrylate, 2-dimethylaminoethyl methacrylate, 2-diethylaminoethyl methacrylate, 2-dimethylaminoethyl benzoate, 2-methylaminoethyl acetate, and the like.

The aluminum trialkyls that can be used as one component of the catalyst mixture according to this invention are well known in the art and can be represented by the formula $AlR_3$ where each R is an alkyl radical, desirably containing 1-12 carbon atoms, and preferably a lower alkyl radical containing 1-8 carbon atoms. Suitable alkyl radicals include methyl, ethyl, propyl, butyl, isobutyl, octyl, decyl, dodecyl and the like. Such aluminum trialkyls include aluminum trimethyl, aluminum triethyl, aluminum triisobutyl, methyl aluminum diethyl, aluminum tridodecyl, aluminum trioctyl, aluminum tridecyl and the like.

The transition metal halide can be selected from the group consisting of titanium and vanadium, the valence of the metal in said halide being at least one less than maximum. Thus, such compounds as titanium trichloride, titanium tribromide, vanadium tribromide, vanadium trichloride, and the like, are employed in the catalyst mixtures according to this invention. For the most desirable results it is preferred to use the chlorides of one of the aforementioned transition metals and specifically preferred are the chlorides of titanium.

The catalyst mixtures employed in the process of this invention are extremely effective at elevated temperatures. Thus, the polymerization reaction can be carried out at temperatures in the range of about 120° to about 300° C., and preferably at temperatures in the range of about 135° to about 250° C., most preferably 150°-180° C. The molar ratio of aluminum trialkyl to transition metal halide is 0.5 to 10:1, preferably 0.5 to 2:1, and the mole ratio of transition metal halide to beta-amino carboxylic ester is 1:0.05 to 1, preferably 1:0.1 to 0.5. At these high temperatures the catalyst is employed in concentrations of about 0.001 to about 0.5%, by weight, preferably 0.005 to about 0.05% by weight, based on the monomer being polymerized. Lower catalyst concentrations can be employed, but generally the rate of polymer formation is quite slow and at higher catalyst concentrations considerable difficulty is encountered in controlling the reaction. The concentration of the catalyst employed will generally depend upon the desired method of operation, for example, low catalyst concentrations would be used where high polymer to catalyst yields are desired. On the other hand, high catalyst concentrations are employed where high polymer yields per unit of reactor space are desired. The polymers formed at the high temperatures employed in this invention are highly crystalline, i.e., they exhibit crystallinities in excess of 70, 80 or even 90%. The crystallinities of the products can be determined by extraction or x-ray diffraction techniques that are well known in the art. For example, the crystallinity of polypropylene is determined by refluxing the polymer in hexane, the portion of the solid polymer insoluble in refluxing hexane being the crystalline portion.

The polymerization in accordance with this invention is generally carried out at pressures in the range of about atmospheric to about 2,000 atmospheres. Usually pressures greater than 15 atmospheres, and preferably in the range of about 15 to 300 atmospheres, are employed to obtain commercially satisfactory rates.

The polymerization reaction can be carried out in the presence of an inert organic liquid diluent. When the polymerization is carried out in the presence of an inert organic liquid diluent, this diluent can be any of the inert organic liquids which contain no combined oxygen and which are free of water, alcohol, ether or other compounds containing oxygen or compounds containing unsaturation. The organic diluent employed can be an aliphatic alkane or cycloalkane such as pentane, hexane, heptane or cyclohexane, or a high molecular weight liquid paraffin or mixture of paraffins which are liquid at the reaction temperature, or an aromatic hydrocarbon such as benzene, toluene, xylene or the like, or a halogenated aromatic compound such as chlorobenzene. A petroleum fraction having a suitable boiling range such as odorless mineral spirits (a sulfuric acid washed paraffinic hydrocarbon boiling at 180°–200° C.) will as diluent give particularly good results. In addition, good results can be obtained when the polymerization is carried out without a diluent as in the presence of a dense gas such as highly compressed propylene by operating at elevated pressures.

This invention can be further illustrated by the following examples of preferred embodiments thereof although it will be understood that these examples are included merely for purposes of illustration and are not intended to limit the scope of the invention unless otherwise specifically indicated.

EXAMPLE 1

In a nitrogen filled dry box 1.0 gram H-TiCl$_3$ (0.0065 mole), 0.197 gram freshly ground LiAlH$_4$ (0.0052 mole), and 30 ml dry mineral spirits were charged to a 100-ml Erlenmeyer flask. This catalyst mixture was stirred at room temperature for 2 hours. The catalyst was placed in a 50-ml charge bomb which was then attached to a 2-liter stainless steel autoclave. The autoclave was charged with 400 ml of mineral spirits, preheated to 160° C., and pressurized to 600 psig with dry propylene. The catalyst was then charged to the stirred autoclave by flushing the bomb with 400 ml of dry mineral spirits. As soon as the temperature lined out at 160° C., the autoclave was pressurized to 1,000 psig with propylene. The polymerization was run under these conditions for 2 hours, with occasional addition of propylene to maintain the pressure near 1,000 psig. Then the polymer solution was discharged into a stainless steel bucket. The gross polypropylene was isolated by blending the contents three times with 3 liters of acetone in a 1-gallon Waring Blendor, followed by filtration. The acetone wet powder was stabilized with about 0.5 percent Irganox 1010 and dried in vacuum at 55° C. for 15 hours. Yield of isolated gross polypropylene was 138 grams. The powder hexane index was 72.5 percent. This is the portion which is insoluble in refluxing hexane. The I.V. of the extracted polypropylene was 1.64 (run in tetralin at 145° C.).

EXAMPLE 2

The procedure of Example 1 was repeated using as the catalyst 0.50 gram HA-TiCl$_3$ (H-TiCl$_3$ attritor milled for 6 hours) and 0.099 gram LiAlH$_4$. The yield of gross polypropylene was 324 grams. Powder hexane index was 52.5 percent, and I.V. of the extracted polypropylene was 0.92.

EXAMPLE 3

The procedure in Example 2 was repeated except that C-TiCl$_3$ was used instead of HA-TiCl$_3$. C-TiCl$_3$ was prepared as described in Ger. Offen. No. 2,213,086. The yield of gross polypropylene was 298 grams. Powder hexane index was 51.9 percent, and I.V. of the extracted polypropylene was 1.05.

EXAMPLE 4

The procedure in Example 1 was repeated using the catalyst prepared as follows: To a 50-ml charge bomb in a nitrogen filled dry box were added 13.1 ml 1.5 percent Et$_3$Al in mineral spirits, 0.60 gram H-TiCl$_3$, 7.4 ml 1.5 percent n-butyl lithium in mineral spirits, and 29 ml dry mineral spirits. The yield of gross polypropylene was 112 grams. Powder hexane index was 72.4 percent, and I.V. of the extracted polypropylene was 1.73.

EXAMPLE 5

The procedure in Example 4 was repeated except the catalyst consisted of 10.9 ml 1.5 percent Et$_3$Al in mineral spirits, 0.50 gram HA-TiCl$_3$, and 6.2 ml 1.5 percent n-butyl lithium in mineral spirits. Yield of gross polypropylene was 294 grams. Powder hexane index was 53.8 percent, and I.V. of the extracted polypropylene was 1.19.

EXAMPLE 6

The procedure of Example 5 was repeated except C-TiCl$_3$ was used instead of HA-TiCl$_3$. Yield of gross polypropylene was 309 grams. Powder hexane index was 50.9 percent, and I.V. of the extracted polypropylene was 1.11.

TABLE I

Performance of Prior Art High Temperature Solution Polypropylene Catalysts Using Different Types of TiCl$_3$

| Example No. | Catalyst Composition | Mole Ratio | Catalyst Activity g PP/g | | Powder Hexane Index, % | I.V. of Extd PP |
|---|---|---|---|---|---|---|
| | | | Cat./ Hr | TiCl$_3$/ Hr | | |
| 1 | LiAlH$_4$/H—TiCl$_3$ | 0.8/1 | 58 | 69 | 72.5 | 1.64 |
| 2 | LiAlH$_4$/HA—TiCl$_3$ | 0.8/1 | 270 | 324 | 52.5 | 0.92 |
| 3 | LiAlH$_4$/C—TiCl$_3$ | 0.8/1 | 248 | 298 | 51.9 | 1.05 |
| 4 | n-BuLi/Et$_3$Al/H—TiCl$_3$ | 0.33/0.33/1 | 67 | 93 | 72.4 | 1.73 |
| 5 | n-BuLi/Et$_3$Al/HA—TiCl$_3$ | 0.33/0.33/1 | 212 | 294 | 53.8 | 1.19 |
| 6 | n-BuLi/Et$_3$Al/C—TiCl$_3$ | 0.33/0.33/1 | 222 | 309 | 50.9 | 1.11 |

Table I summarizes the performances of the most preferred prior art catalysts for solution polymerization of propylene using different types of TiCl$_3$.

The results show clearly that the more active forms of TiCl$_3$, including HA-TiCl$_3$ and C-TiCl$_3$ cannot be used in the prior art solution polypropylene catalysts because they produce polypropylene of unacceptably low crystallinity or hexane index and I.V. However, only the H-TiCl$_3$ in these prior art catalysts provides satisfactory products having high crystallinities but the catalyst activities are too low.

Examples 7-11 illustrate the performances of catalysts of this invention for solution polymerization of propylene.

EXAMPLE 7

The procedure of Example 4 was repeated using as catalyst 0.12 gram HA-TiCl$_3$ and 12 ml of a mineral spirits solution 0.097 molar in Et$_3$Al and 0.013 molar in 2-dimethylaminoethyl methacrylate. The yield of gross polypropylene was 309 grams. Powder hexane index was 73.8 percent, and I.V. of the extracted polypropylene was 1.75.

EXAMPLE 8

The procedure of Example 7 was repeated using 0.15 gram HA-TiCl$_3$ and 15 ml of a mineral spirits solution 0.097 molar in Et$_3$Al and 0.025 molar in 2-dimethylaminoethyl methacrylate. The yield of gross polypropylene was 233 grams. Powder hexane index was 79.4 percent, and I.V. of the extracted polypropylene was 2.19.

EXAMPLE 9

The procedure of Example 7 was repeated using 0.14 gram HA-TiCl$_3$ and 14 ml of a mineral spirits solution 0.097 molar in Et$_3$Al and 0.013 molar in 2-dimethylaminoethyl acetate. The yield of gross polypropylene was 286 grams. Powder hexane index was 74.7 percent, and I.V. of the extracted polypropylene was 1.56.

EXAMPLE 10

The procedure of Example 7 was repeated using 0.18 gram HA-TiCl$_3$ and 18 ml of a mineral spirits solution 0.097 molar in Et$_3$Al and 0.026 molar in 2-dimethylaminoethyl acetate. The yield of gross polypropylene was 174 grams. Powder hexane index was 84.2 percent, and I.V. of the extracted polypropylene was 2.80.

EXAMPLE 11

The procedure of Example 7 was repeated using 0.20 gram HA-TiCl$_3$ and 20 ml of a mineral spirits solution 0.065 molar in Et$_3$Al and 0.013 molar in 2-dimethylaminoethyl acetate. The yield of gross polypropylene was 252 grams. Powder hexane index was 77.4 percent, and I.V. of the extracted polypropylene was 1.96.

Table II summarizes the performances of catalysts of this invention and compares them to the previously used prior art catalysts for high temperature solution polymerization of propylene.

TABLE II

Comparison of Catalysts of This Invention to the Best Prior Art Solution Polypropylene Catalysts

| Example No. | Catalyst Composition | Mole Ratio | Catalyst Activity, g PP/g | | Powder Hexane Index, % | I.V. of Extd PP |
|---|---|---|---|---|---|---|
| | | | Cat./ Hr | TiCl$_3$/ Hr | | |
| 1 | LiAlH$_4$/H—TiCl$_3$ | 0.8/1 | 58 | 69 | 72.5 | 1.64 |
| 4 | n-BuLi/Et$_3$Al/H—TiCl$_3$ | 0.33/0.33/1 | 67 | 93 | 72.4 | 1.73 |
| 7 | CH$_2$=C(CH$_3$)—C(=O)—O—CH$_2$CH$_2$N(CH$_3$)$_2$/Et$_3$Al/HA—TiCl$_3$ | 0.2/1.5/1 | 556 | 1,288 | 73.8 | 1.75 |
| 8 | CH$_2$=C(CH)—C(=O)—O—CH$_2$CH$_2$N(CH$_3$)$_2$/Et$_3$Al/HA—TiCl$_3$ | 0.4/1.5/1 | 308 | 777 | 79.4 | 2.19 |
| 9 | CH$_3$CO$_2$CH$_2$CH$_2$N(CH$_3$)$_2$/Et$_3$Al/HA—TiCl$_3$ | 0.2/1.5/1 | 449 | 1,022 | 74.7 | 1.56 |
| 10 | CH$_3$CO$_2$CH$_2$CH$_2$N(CH$_3$)$_2$/Et$_3$Al/HA—TiCl$_3$ | 0.4/1.5/1 | 198 | 484 | 84.2 | 2.80 |
| 11 | CH$_3$CO$_2$CH$_2$CH$_2$N(CH$_3$)$_2$/Et$_3$Al/HA—TiCl$_3$ | 0.2/1/1 | 330 | 630 | 77.4 | 1.96 |

As noted, the catalysts of this invention are all much more active than the best prior art catalysts. These catalysts can produce polypropylene of slightly higher hexane index at 13 times the catalyst activity compared to the best prior art catalyst, or they can produce polypropylene with about 12 percent higher hexane index and much higher I.V. at 5 times the catalyst activity of the best prior art catalyst. Moreover, this very high I.V. polypropylene had not previously been produced under solution polymerization conditions at temperatures as high as 160° C.

Examples 12–15 illustrate the performances of other similar electron donors disclosed in the art as third components and the results obtained by their use as high temperature solution polypropylene catalysts.

EXAMPLE 12

The procedure of Example 7 was repeated using 0.15 gram $HA$-$TiCl_3$, 9.8 ml 1.5 percent $Et_3Al$ in mineral spirits, and 3.9 ml 0.05 molar N,N-dimethylacetamide in mineral spirits as catalyst. The yield of gross polypropylene was 208 grams. Powder hexane index was 65.8 percent, and I.V. of the extracted polypropylene was 1.70.

EXAMPLE 13

Example 7 was repeated using as catalyst 0.10 gram $HA$-$TiCl_3$, 6.6 ml 1.5 percent $Et_3Al$ in mineral spirits, and 5.2 ml 0.05 M lauryldimethylamine. The yield of gross polypropylene was 259 grams. Powder hexane index was 68.1 percent, and I.V. of the extracted polypropylene was 1.65.

EXAMPLE 14

Example 13 was repeated except that tri-n-butylamine was used instead of lauryldimethylamine. The yield of gross polypropylene was 233 grams. Powder hexane index was 63.1 percent, and I.V. of the extracted polypropylene was 1.43.

EXAMPLE 15

Example 7 was repeated using as catalyst 0.80 gram $HA$-$TiCl_3$ and 26.3 ml of a mineral spirit solution 0.099 molar in $Et_3Al$ and 0.0198 molar in dimethyl carbonate. The yield of gross polypropylene was 337 grams. Powder hexane index was 56.0 percent, and I.V. of the extract polypropylene was 0.88.

Table III compares the performances of the catalysts of this invention to similar three component catalysts containing third components which are less effective.

TABLE III

Comparison of Beta-Amino Esters to Other Third Components in High Temperature Solution Polypropylene Catalysts

| Example No. | Catalyst Composition | Mole Ratio | Catalyst Activity, g PP/g Cat./Hr | Catalyst Activity, g PP/g $TiCl_3$/Hr | Powder Hexane Index, % | I.V. of Extd PP |
|---|---|---|---|---|---|---|
| 7 | $CH_2{=}C(CH_3){-}C({=}O){-}O{-}CH_2CH_2N(CH_3)_2$/$Et_3Al$/$HA$—$TiCl_3$ | 0.2/1.5/1 | 556 | 1,288 | 73.8 | 1.75 |
| 8 | $CH_2{=}C(CH_3){-}C({=}O){-}O{-}CH_2CH_2N(CH_3)_2$/$Et_3Al$/$HA$—$TiCl_3$ | 0.4/1.5/1 | 308 | 777 | 79.4 | 2.19 |
| 9 | $CH_3CO_2CH_2CH_2N(CH_3)_2$/$Et_3Al$/$HA$—$TiCl_3$ | 0.2/1.5/1 | 449 | 1,022 | 74.7 | 1.56 |
| 10 | $CH_3CO_2CH_2CH_2N(CH_3)_2$/$Et_3Al$/$HA$—$TiCl_3$ | 0.4/1.5/1 | 198 | 484 | 84.2 | 2.80 |
| 11 | $CH_3CO_2CH_2CH_2N(CH_3)_2$/$Et_3Al$/$HA$—$TiCl_3$ | 0.2/1/1 | 330 | 630 | 77.4 | 1.96 |
| 12 | $CH_3C({=}O)N(CH_3)_2$/$Et_3Al$/$HA$—$TiCl_3$ | 0.2/1/1 | 375 | 694 | 65.8 | 1.70 |
| 13 | $C_{12}H_{25}N(CH_3)_2$/$Et_3Al$/$HA$—$TiCl_3$ | 0.4/1/1 | 566 | 1,295 | 68.1 | 1.65 |
| 14 | $n$-$Bu_3N$/$Et_3Al$/$HA$—$TiCl_3$ | 0.4/1/1 | 525 | 1,165 | 63.1 | 1.43 |
| 15 | $(CH_3O)_2C{=}O$/$Et_3Al$/$HA$—$TiCl_3$ | 0.1/0.5/1 | 453 | 647 | 56.0 | 0.88 |

This comparison demonstrates the unexpected and unobvious result obtained with the catalysts of this invention. Since aliphatic amines, esters, and amides alone are not effective stereoregulating third components (Examples 12–15), it was surprising when the beta-amino esters performed so effectively as stereoregulating catalyst components.

Thus, at high temperatures a two component mixture comprising titanium trichloride and an aluminum trialkyl, even with the preferred subvalent transition metal halide of this invention, i.e., titanium trichloride, is not a commercially effective catalyst to form solid, highly crystalline polymers from α-olefins containing at least 3 carbon atoms at high temperatures. In contrast, the addition of a beta-amino carboxylic ester to the same trialkyl aluminum and titanium trichloride catalyst combination according to this invention, is extremely effective in forming solid, high molecular weight, highly crystalline polymers from α-olefins containing at least 3 carbon atoms at high temperatures.

By the practice of this invention there is provided to the art a high temperature polymerization process employing a very specific catalyst mixture that can be used to form solid, high molecular weight, highly crystalline polymers from α-olefins containing at least 3 carbon atoms. The components of the catalyst mixture are readily available materials and are easily handled in commercial operation which makes the process disclosed herein readily adaptable to commercial scale production. The polymers that are obtained in accordance with the practice of this invention can be used for forming films, molded articles, coated articles and the like and can be blended with other resinous materials or compound with pigments, dyes, fillers, stabilizers and the like. The process of this invention is applicable to forming copolymers from α-olefins containing at least 3 carbon atoms and ethylene. Such copolymers provide a variety of products which are readily obtained by varying the relative proportions of the monomers in the mixtures of monomers being polymerized.

Although the invention has been described in considerable detail reference to certain preferred embodiments thereof, it will be understood that variations and modifications can be effected without departing from the spirit and scope of the invention as described hereinabove and as defined in the appended claims.

We claim:

1. The process for polymerizing an α-mono-olefin containing at least 3 carbon atoms to solid, high molecular weight polymer having a crystallinity of at least 72% which comprises contacting said α-mono-olefins, at a temperature in the range of about 120° to about 300° C. and a pressure in the range of about atmospheric to about 2,000 atmospheres, with a catalyst mixture comprising (1) an aluminum trialkyl, (2) a halide of a transition metal selected from the group consisting of titanium and vanadium, the valence of the metal in said halide being at least one less than maximum and (3) a 2-amino alkyl carboxylate wherein the molar ratio of catalyst components is 0.5–10/1/0.05–1.

2. The process of claim 1 wherein said aluminum trialkyl is triethyl aluminum.

3. The process of claim 2 wherein said halide of a transition metal is titanium trichloride.

4. The process of claim 3 wherein said 2-amino alkyl carboxylate is 2-dimethylaminoethyl acetate.

5. The process of claim 3 wherein said 2-amino alkyl carboxylate is 2-dimethylaminoethyl methacrylate.

6. The process for polymerizing an α-mono-olefin containing at least 3 carbon atoms to solid, high molecular weight polymer having a crystallinity of at least 72% which comprises contacting said α-mono-olefins, at a temperature in the range of about 135° C. to about 250° C. and a pressure in the range of about atmospheric to about 2,000 atmospheres, with a catalyst mixture comprising (1) an aluminum trialkyl, (2) a halide of a transition metal selected from the group consisting of titanium and vanadium, the valence of the metal in said halide being at least one less than maximum and (3) a 2-amino alkyl carboxylate wherein the molar ratio of catalyst components is 0.5–2/1/0.1–0.5

7. The process of claim 6 wherein said aluminum trialkyl is triethyl aluminum.

8. The process of claim 7 wherein said halide of a transition metal is titanium trichloride.

9. The process of claim 8 wherein said 2-amino alkyl carboxylate is 2-dimethylaminoethyl acetate.

10. The process of claim 8 wherein said 2-amino alkyl carboxylate is 2-dimethylaminoethyl methacrylate.

11. The process for polymerizing an α-mono-olefin containing at least 3 carbon atoms to solid, high molecular weight polymer having a crystallinity of at least 72% which comprises contacting said α-mono-olefins, at a temperature in the range of about 150° C. to about 180° C. and a pressure in the range of about atmospheric to about 2,000 atmospheres, with a catalyst mixture comprising (1) an aluminum trialkyl, (2) a halide of a transition metal selected from the group consisting of titanium and vanadium, the valence of the metal in said halide being at least one less than maximum and (3) a 2-amino alkyl carboxylate wherein the molar ratio of catalyst components is 0.5–2/1/0.1–0.5.

12. The process of claim 11 wherein said aluminum trialkyl is triethyl aluminum.

13. The process of claim 12 wherein said halide of a transition metal is titanium trichloride.

14. The process of claim 13 wherein said 2-amino alkyl carboxylate is 2-dimethylaminoethyl acetate.

15. The process of claim 13 wherein said 2-amino alkyl carboxylate is 2-dimethylaminoethyl methacrylate.

* * * * *